US012585422B2

(12) United States Patent
Hasegawa et al.

(10) Patent No.: US 12,585,422 B2
(45) Date of Patent: Mar. 24, 2026

(54) DATA PROCESSING METHOD OF PROCESSING MULTITRACK AUDIO DATA AND DATA PROCESSING APPARATUS

(71) Applicant: YAMAHA CORPORATION, Hamamatsu (JP)

(72) Inventors: Masatoshi Hasegawa, Hamamatsu (JP); Yuki Suemitsu, Hamamatsu (JP); Naoki Toriyama, Funabashi (JP); Yoshihiro Nakamura, Hamamatsu (JP); Yoshiyuki Tsuge, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 158 days.

(21) Appl. No.: 18/465,496

(22) Filed: Sep. 12, 2023

(65) Prior Publication Data

US 2023/0418547 A1     Dec. 28, 2023

Related U.S. Application Data

(63) Continuation of application No. PCT/JP2021/030041, filed on Aug. 17, 2021.

(30) Foreign Application Priority Data

Mar. 18, 2021     (JP) .................................. 2021-044311

(51) Int. Cl.
    G06F 3/16          (2006.01)
(52) U.S. Cl.
    CPC .................................... G06F 3/162 (2013.01)
(58) Field of Classification Search
    CPC .................................................... G06F 3/162
    See application file for complete search history.

(56) References Cited

U.S. PATENT DOCUMENTS

2003/0223409 A1* 12/2003 Wiebe ...................... H04J 3/22
                                                          370/352
2010/0092002 A1     4/2010 Yoshino et al.
                    (Continued)

FOREIGN PATENT DOCUMENTS

JP          S13014763 U     10/1938
JP          H06069953 U      9/1994
                    (Continued)

OTHER PUBLICATIONS

International Search Report issued in Intl. Appln. No. PCT/JP2021/030041 mailed Oct. 19, 2021. English translation provided.
                    (Continued)

*Primary Examiner* — Joseph Saunders, Jr.
(74) *Attorney, Agent, or Firm* — ROSSI, KIMMS & McDOWELL LLP

(57)          ABSTRACT

A data processing method performed by a processor that receives data signals from a plurality of devices that utilize different protocols from each other receives data signals, respectively, from each of the plurality of devices, and generates multitrack audio data, in which audio data of a plurality of channels is stored by storing a first data string of a digital audio signal, received from a first device of the plurality of devices that utilizes a first protocol, in a first channel of the plurality of channels, and storing a data string of a digital signal, related to the digital audio signal and received from a second device of the plurality of devices that utilizes a second protocol different from the first protocol, as a second data string of the digital audio signal in a second channel of the plurality of channels.

20 Claims, 15 Drawing Sheets

(56)                    References Cited

U.S. PATENT DOCUMENTS

| | | | |
|---|---|---|---|
| 2019/0069375 A1* | 2/2019 | Baker | ................ H04N 21/4394 |
| 2021/0006789 A1 | 1/2021 | Zhou | |
| 2021/0067890 A1 | 3/2021 | Tsuge | |

FOREIGN PATENT DOCUMENTS

| | | | |
|---|---|---|---|
| JP | H09146171 | A | 6/1997 |
| JP | 2006077565 | A | 3/2006 |
| JP | 2013178293 | A | 9/2013 |
| WO | 2008111143 | A1 | 9/2008 |

OTHER PUBLICATIONS

Written Opinion issued in Intl. Appln. No. PCT/JP2021/030041 mailed Oct. 19, 2021.

Office Action issued in Japanese Appln. No. 2022-015666, mailed on Apr. 1, 2025. English machine translation provided.

English translation of Written Opinion issued in Intl. Appln. No. PCT/JP2021/030041, mailed on Oct. 19, 2021, previously cited in IDS filed Sep. 12, 2023.

International Preliminary Report on Patentability issued in Intl. Appln. No. PCT/JP2021/030041, mailed on Sep. 28, 2023. English translation provided.

Office Action issued in Japanese Appln. No. 2022-015666, mailed on Jan. 21, 2025. English machine translation provided.

Extended European Search Report issued in European Appln. No. 21931655.1, mailed on Jan. 31, 2025.

* cited by examiner

FIG.5

| 0 | 1 | 2 | 3 | 4 | 5 | 6 | 7 |
|---|---|---|---|---|---|---|---|
| Start Bit | Data Size Flag | Type | <- | <- | <- | <- | <- |
| Data | <- | <- | <- | <- | <- | <- | <- |
| <- | <- | <- | <- | <- | <- | <- | <- |

Figure 6:
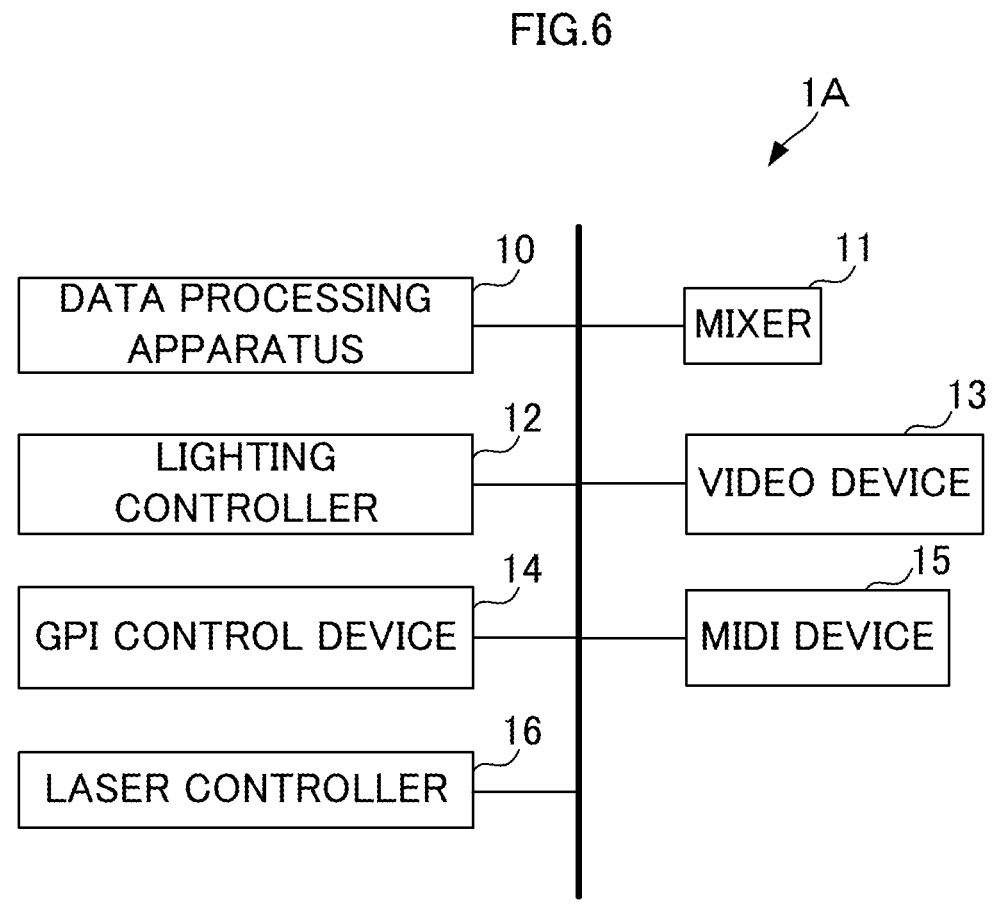

| | | |
|---|---|---|
| DATA PROCESSING APPARATUS — 10 | | MIXER — 11 |
| LIGHTING CONTROLLER — 12 | | VIDEO DEVICE — 13 |
| GPI CONTROL DEVICE — 14 | | MIDI DEVICE — 15 |
| LASER CONTROLLER — 16 | | |

DATA PROCESSING METHOD OF PROCESSING MULTITRACK AUDIO DATA AND DATA PROCESSING APPARATUS

CROSS REFERENCE TO RELATED APPLICATIONS

The present application is a continuation application of International Patent Application No. PCT/JP2021/030041, filed on Aug. 17, 2021, which claims priority to Japanese Patent Application No. 2021-044311, filed on Mar. 18, 2021. The contents of these applications are incorporated herein by reference in their entirety.

TECHNICAL FIELD

An embodiment of the present disclosure relates to a data processing method of processing multitrack audio data in which audio data of a plurality of channels is stored.

BACKGROUND ART

Patent Literature 1 describes receiving audio data of a plurality of channels and controlling strength of reverberation effects, and brightness or color of lighting of a display such as an LCD, based on correlation between the channels.

CITATION LIST

Patent Literature

[Patent Literature 1] International Publication No. 2008/111143

SUMMARY

Technical Problem

The method of Patent Literature 1 only controls the strength of reverberation effects, and the brightness or color of lighting of a display such as an LCD, in accordance with the correlation between the channels.

In an event such as a live performance, a variety of devices including acoustic devices, video devices, and lighting devices are handled. A signal handled by each of the devices uses a different protocol. Therefore, a plurality of devices is needed to handle data of each protocol.

Therefore, an embodiment of the present disclosure aims to provide a data processing method capable of collectively handling a variety of devices that handle a variety of protocols.

In one aspect, a data processing method according to an embodiment of the present disclosure is a data processing method performed by a processor that receives data signals from a plurality of devices that utilize different protocols from each other, and the data processing method receives data signals, respectively, from each of the plurality of devices, and generates multitrack audio data, in which audio data of a plurality of channels is stored by storing a first data string of a digital audio signal, received from a first device of the plurality of devices that utilizes a first protocol, in a first channel of the plurality of channels, and storing a data string of a digital signal, related to the digital audio signal and received from a second device of the plurality of devices that utilizes a second protocol different from the first protocol, as a second data string of the digital audio signal in a second channel of the plurality of channels.

Advantageous Effects of the Disclosure

According to an embodiment of the present disclosure, a variety of devices that handle a variety of protocols is able to be collectively handled.

BRIEF DESCRIPTION OF DRAWINGS

FIG. 5 is a view showing an example of a format in a case of storing a digital signal different from audio data as a data string of a digital audio signal.

FIG. 6 is a block diagram showing a configuration of a data processing system LA under a reproduction environment of a live performance.

FIG. 10 is a front view and a side view of an individual panel 70A.

FIG. 15 is a front view and a side view of the individual panel 70A.

DETAILED DESCRIPTION OF EMBODIMENTS

Figure 1:
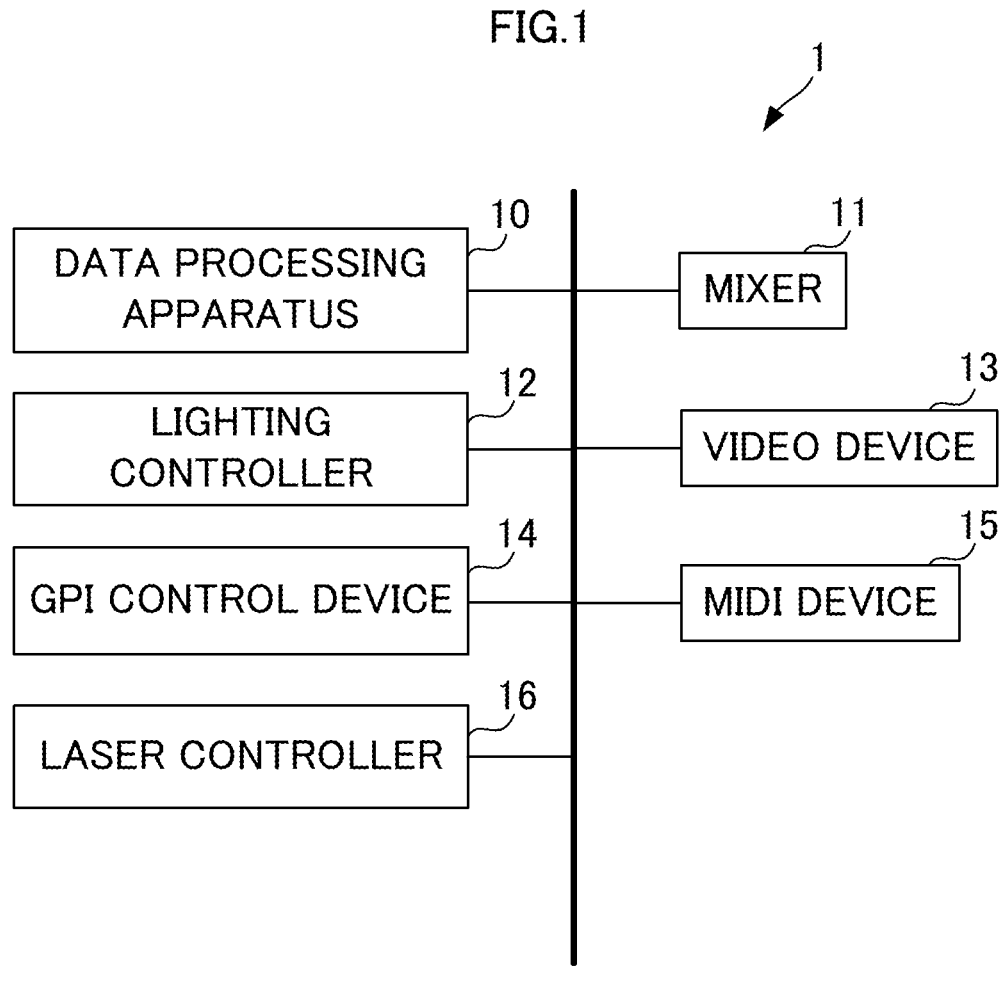
FIG. 1 is a block diagram showing a configuration of a data processing system 1.

FIG. 1 is a block diagram showing a configuration of a data processing system 1. The data processing system 1 includes a data processing apparatus 10, a mixer 11, a lighting controller 12, a video device 13, a GPI control device 14, a MIDI device 15, and a laser controller 16.

Each device is connected by a communication standard such as a USB cable, HDMI (registered trademark), Ethernet (registered trademark), or MIDI, for example. Each device is installed in a venue in which an event such as a live performance, for example, is performed.

The mixer 11 connects a plurality of acoustic devices such as microphones, musical instruments, or amplifiers. The mixer 11 receives a digital or analog audio signal from the plurality of acoustic devices. The mixer 11, in a case of receiving an analog audio signal, converts the analog audio signal into a 24-bit digital audio signal with a sampling frequency of 48 kHz, for example. The mixer 11 performs signal processing such as mixing, gain adjustment, equalizing, or compressing, on a plurality of digital audio signals.

The mixer 11 sends the digital audio signal on which the signal processing has been performed, to the data processing apparatus 10.

The lighting controller 12 controls various types of lighting to be used for production of an event such as a live performance. The lighting controller 12 sends a control signal of a predetermined form (DMX512, for example) for controlling lighting, to the data processing apparatus 10. In addition, the laser controller 16 also sends a control signal of a predetermined form (DMX512, for example) for controlling various types of lasers to be used for production of an event such as a live performance, to the data processing apparatus 10.

The video device 13 includes a camera and captures a performer of the event or the like. The video device 13 sends video data captured by the camera as data in a predetermined form (MPEG 4, for example), to the data processing apparatus 10. The GPI control device 14 sends a GPI (General Purpose Interface) control signal to be used for control of a device such as a sensor, a processor, or a motor, to the data processing apparatus 10. The MIDI device 15 includes an electronic musical instrument, for example, and sends a MIDI (Musical Instrument Digital Interface) signal to the data processing apparatus 10.

Figure 2:
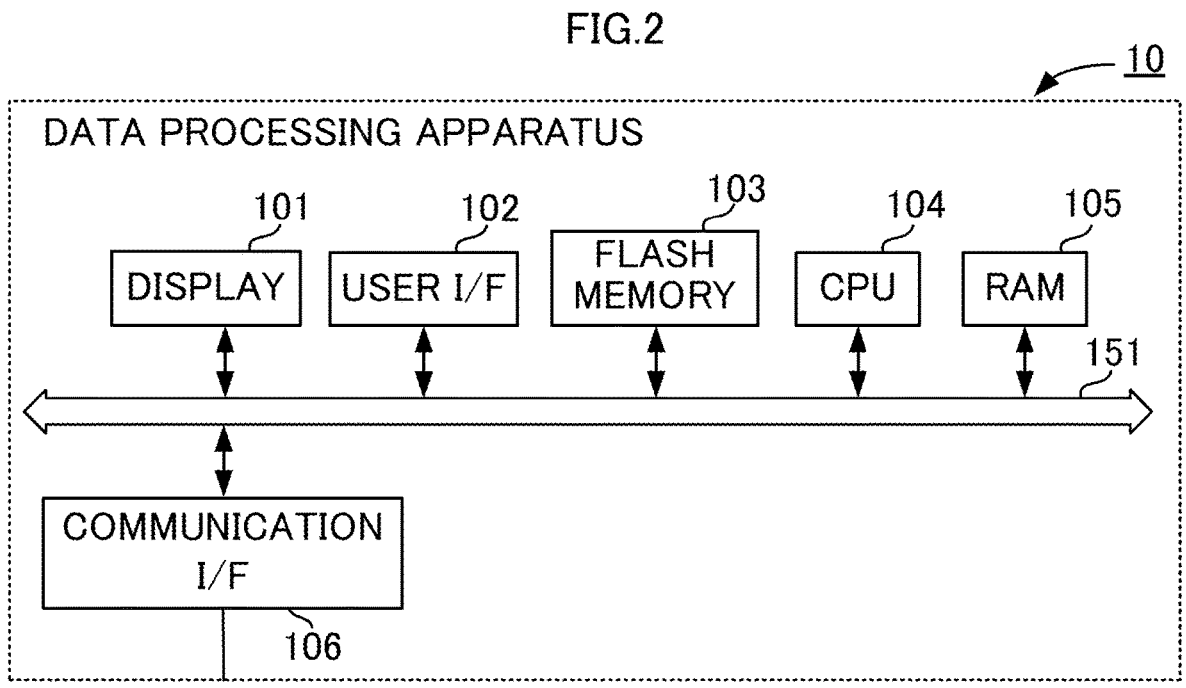
FIG. 2 is a block diagram showing a main configuration of a data processing apparatus 10.

FIG. 2 is a block diagram showing a main configuration of the data processing apparatus 10. The data processing apparatus 10 is mainly made of a common personal computer, and includes a display 101, a user interface (I/F) 102, a flash memory 103, a CPU 104, a RAM 105, and a communication interface (I/F) 106.

The display 101 is made of an LCD (Liquid Crystal Display) or an OLED (Organic Light-Emitting Diode), for example, and displays various types of information. The user I/F 102 includes a switch, a keyboard, a mouse, a trackball, or a touch panel, and receives an operation from a user. In a case in which the user I/F 102 is a touch panel, the user I/F 102 constitutes a GUI (Graphical User Interface, the rest is omitted) together with the display 101.

The communication I/F 106 is connected to the mixer 11, the lighting controller 12, the video device 13, the GPI control device 14, the MIDI device 15, and the laser controller 16 through a communication line such as a USB cable, HDMI (registered trademark), Ethernet (registered trademark), or MIDI. The communication I/F 106 receives the digital audio signal from the mixer 11. In addition, the communication I/F 106 receives various types of digital signals from the devices of the lighting controller 12, the video device 13, the GPI control device 14, the MIDI device 15, and the laser controller 16. It is to be noted that the mixer 11 may send the digital audio signal to the data processing apparatus 10 through Ethernet (registered trademark) by use of a protocol such as Dante (registered trademark).

The CPU 104 corresponds to a processor of the present disclosure. The CPU 104 reads a program stored in the flash memory 103 being a storage medium to the RAM 105 and implements a predetermined function. For example, the CPU 104 displays an image for receiving an operation from the user on the display 101, and, by receiving a selection operation to the image, or the like, through the user I/F 102, implements the GUI. The CPU 104 receives a digital signal from other devices through the communication I/F 106. The CPU 104 generates multitrack audio data, based on a received digital signal. In addition, the CPU 104 stores generated multitrack audio data in the flash memory 103. Alternatively, the CPU 104 distributes the generated multitrack audio data.

It is to be noted that the program that the CPU 104 reads does not need to be stored in the flash memory 103 in the own apparatus. For example, the program may be stored in a storage medium of an external apparatus such as a server. In such a case, the CPU 104 may read the program each time from the server to the RAM 105 and may execute the program.

The multitrack audio data complies with the protocol of Dante (registered trademark), for example. For example, Dante (registered trademark) is able to transmit a 64-channel audio signal in 100 base-TX. Each channel stores a 24-bit digital audio signal (uncompressed digital audio data in a WAV format or the like) with a sampling frequency of 48 kHz, for example. However, in the present disclosure, the number of channels of the multitrack audio data, the sampling frequency, and the number of bits is not limited to this example. In addition, the multitrack audio data does not also need to comply with the protocol of Dante (registered trademark).

Figure 3:
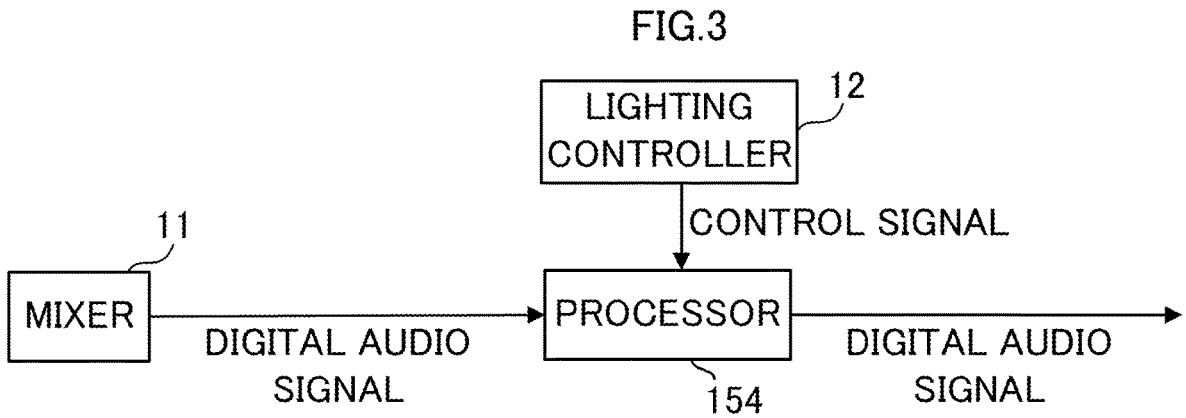
FIG. 3 is a block diagram showing an operation of a CPU 104.
Figure 4:
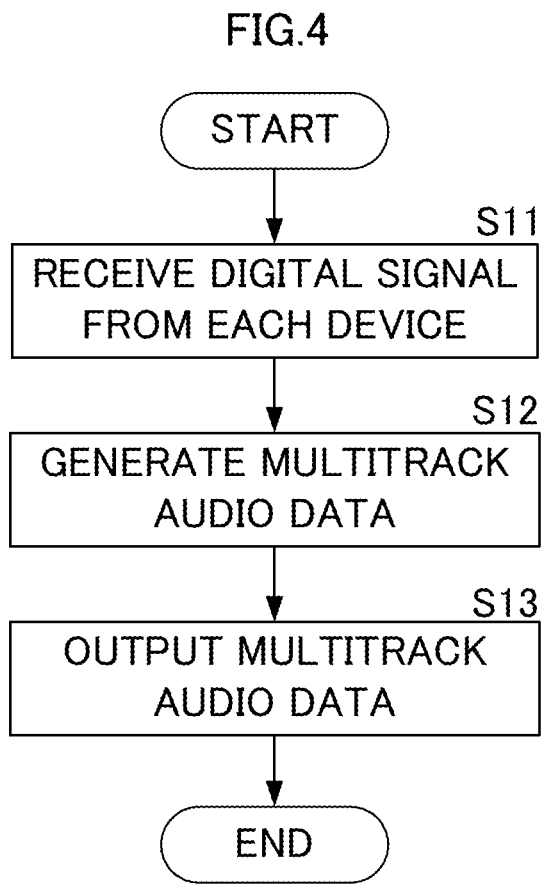
FIG. 4 is a flowchart showing an example of a format in a case of storing a digital signal different from audio data as a data string of a digital audio signal.

FIG. 3 is a functional block diagram showing the minimum configuration of the present disclosure. The processor 154 shown in FIG. 3 is achieved by software that the CPU 104 executes. FIG. 4 is a flowchart showing an operation of the processor 154. The processor 154 receives a digital signal from each device of the mixer 11, the lighting controller 12, the video device 13, the GPI control device 14, the MIDI device 15, the laser controller 16, and the like (S11). The processor 154 receives the digital audio signal from the mixer 11, and receives the control signal from another device (the lighting controller 12, for example).

Then, the processor 154 generates the multitrack audio data, based on the received digital signal from each device (S12). Specifically, the processor 154 stores a data string of the digital audio signal received from the mixer 11, in a first channel of the multitrack audio data. The processor 154, in a case of receiving the audio data based on the protocol of Dante (registered trademark) from the mixer 11, stores the data string of the digital audio signal of each channel of received audio data in the same channel of the multitrack audio data as it is.

In addition, the processor 154 stores a digital signal related to the digital audio signal received from the mixer 11 and different from the audio data, as a data string of the digital audio signal, in a second channel of the multitrack audio data. The digital signal different from the audio data corresponds to the digital signal received from the devices of the lighting controller 12, the video device 13, the GPI control device 14, the MIDI device 15, and the laser controller 16. The processor 154 receives a digital signal different from the audio data from at least one of the devices, and stores received data as a data string of the digital audio signal of the second channel. FIG. 3, as an example, shows an example in which the processor 154 receives a digital signal of DMX512 including a control signal of lighting from the lighting controller 12.

FIG. 5 is a view showing an example of a format in a case of storing a digital signal different from the audio data as a data string of the digital audio signal. As described above, the digital audio signal of each channel of the multitrack audio data is a 24-bit digital audio signal with a sampling frequency of 48 kHz, as an example. FIG. 5 shows a data string of a certain sample of a certain channel in the multitrack audio data. The multitrack audio data has the first channel in which the received digital audio signal is stored as the data string of the digital audio signal as it is, and the second channel made of the data string as shows in FIG. 5. The number of first channels and second channels each may be any. As an example, the processor 154 stores the digital audio signal of the audio data received from the mixer 11, as the first channel, in channels 1 to 32, and stores the digital signal different from the audio data received from other than the mixer 11, as the second channel, in channels 33 to 64.

As shown in FIG. 5, each sample of the second channel is made of 8-bit header information and a data body. A data body includes an 8-bit or 16-bit data string. In the example of FIG. 3, the 8-bit or 16-bit data string corresponds to the digital signal of DMX512.

The 8-bit header information includes a start bit, a data size flag, and data of a type. The start bit is 1-bit data that indicates whether or not data of the sample is head data. The start bit, in a case of being 1, indicates the head data. In short, the sample from the sample indicating that the start bit indicates 1 to a sample indicating that the start bit next indicates 1 corresponds to data of one control signal of DMX512.

The data size flag is 1-bit data that indicates data size. For example, the data size flag, in a case of being 1, indicates that 8-bit data is included in one sample, and the data size flag, in a case of being 0, indicates that 16-bit data is included in one sample. For example, in a case in which one data of DMX512 includes 24-bit data, the start bit of a first sample is 1, and the data size flag is 0. The start bit of a second sample is 0, and the data size flag is 1. In a case in which the one data of DMX512 is 8-bit data, the start bit of each sample is 0.

Next, the type is identification information that indicates the type of data, and is 6-bit data. In this example, the type is 6-bit, and therefore indicates 64 data types. As a matter of course, the number of bits is not limited to 6. The number of bits of the type is able to be set as the number of bits according to the number of required types.

The type, for example, indicates the data of DMX512 as data of "01." The type, for example, indicates data of MIDI as data of "02." The type, for example, indicates data of GPI as data of "03." In addition, the type, for example, indicates Idle data (empty data) as data of "00." However, "3F" in which all bit data is 1 is not preferably used. In a case in which the processor 154 does not use "3F," an apparatus that reproduces the multitrack audio data is able to determine that some failure has occurred when all the bit data is 1. The processor 154, when all the bit data is 1, does not reproduce the multitrack audio data and does not output the control signal. As a result, the processor 154, in a case in which an abnormal signal is outputted, does not do a damage or the like to a device such as lighting. It is to be noted that the processor 154, when setting the type to "00" and setting all the bit data to 0, that is, Idle data (empty data), preferably sets the start bit to 1 so as not to set all the bits to 0. As a result, an apparatus that processes the multitrack audio data is able to determine that some failure has occurred when all the bit data is 0. The processor 154, when all the bit data is 0, does not reproduce the multitrack audio data and does not output the control signal. In this case as well, the processor 154, in the case in which an abnormal signal is outputted, does not do a damage or the like to the device such as lighting.

In addition, the processor 154, in a case in which data that does not match the data format shown in FIG. 5 is included, may not reproduce the multitrack audio data and may not output the control signal. For example, in a case in which the data size flag is 1, low 8 bits are all 0-bit data bits (or all 1-bit data). Therefore, the processor 154, in a case in which 0- and 1-bit data are mixed in the low 8 bits although the data size flag is 1, does not reproduce the multitrack audio data and does not output the control signal. In this case as well, the processor 154, in the case in which an abnormal signal is outputted, does not do a damage or the like to the device such as lighting.

It is to be noted that the processor 154 may include only data of the same type in the same channel and may include data of a different type in the same channel. In short, the processor 154 may include only one piece of identification information in the same channel of the second channel, and may include a plurality of pieces of identification information in one channel.

In addition, the processor 154 may store the data of the same type across a plurality of predetermined channels. For example, the processor 154 stores the data in each of three channels of the channels 33, 34, and 35 in order. In this case, all the channels 33, 34, and 35 include bit data of the same type. The processor 154, in a case of hypothetically setting the data size flag of all of the channels 33, 34, and 35 to 0, is able to store triple (48 bits) data in one sample. Alternatively, the processor 154, in a case of storing the data of the same type in four channels, for example, is able to store quadruple (64 bits) data in one sample. In this way, the processor 154 is also able to store data (video data, for example) of a type of which the data volume per unit time is large, in one sample, by storing data across the plurality of channels.

Furthermore, the processor 154, in the case of storing the data across the plurality of channels, adds head information only to one channel (the channel 33, for example) as a representative, so that other channels do not have to load header information. In this case, the processor 154 is able to store 16-bit data in a representative channel, and other channels are able to store 24-bit data at the maximum. That is to say, the processor 154 is able to store 64-bit data at the maximum in three channels. It is to be noted that, in this case, the data size flag of the representative channel may not be 1 bit but, for example, may be 3 bits (bit data that indicates eight types of data size).

In addition, the data processing apparatus 10 may receive data according to a signal processing parameter showing content of the signal processing or a basic setting of the mixer 11, from the acoustic device such as the mixer 11, and may store the data in the second channel as a data string of the digital audio signal.

It is to be noted that, as described above, in the present disclosure, the sampling frequency of the multitrack audio data is not limited to 48 kHz, and the number of bits is not limited to 24 bits. For example, in a case in which the sampling frequency of the multitrack audio data is 96 kHz, the processor 154 may generate 48-kHz sampling data as invalid data once every two samples. In addition, in a case in which the number of bits is 32 bits, the processor 154 may not use the low 8 bits, but may use upper 24 bits.

For example, the bit rate of DMX512 is 250 kbps. On the other hand, the bit rate of 48-kHz 24-bit digital audio data is 2304 kbps. In addition, the bit rate of MIDI is 31.25 kbps. In short, the bit rate of the digital audio data is 9.216 times the bit rate of DMX512, and is 73.728 times the bit rate of MIDI. Therefore, the data processing apparatus 10, in a case of storing a digital signal with a bit rate lower than the bit rate of the digital audio data, sets at least one sample among a plurality of samples as invalid data, and stores data in the samples other than the invalid data. For example, the data processing apparatus 10, in a case of storing the data of DMX512, sets eight samples of nine samples as invalid data, and stores the data of DMX512 in one remaining sample. In this case, on a reproduction side, the digital signal of the second channel may lag by about one sample. However, a time lag of 48-kHz sampling frequency is only 0.0208 msec, and, when several samples hypothetically lag, the time lag is less than 1 msec. The device such as lighting performs control at intervals of about a few msec, so that, even when the time lag of less than 1 msec occurs, a lag in control timing may not occur.

Alternatively, as described above, the data processing apparatus 10 may include data of a different type in the same channel. The data processing apparatus 10 may store a digital signal of a plurality of types of data in one channel. In addition, in a case in which data of the same type is data having a plurality of channels, the data processing apparatus 10 may store a digital signal of the data of the plurality of channels in one channel. For example, DMX512 includes a control signal of the plurality of channels in order to control a plurality of lighting devices. Therefore, the data processing apparatus 10 may store the digital signal of DMX512 of the plurality of channels in one channel. It is to be noted that, in a case in which DMX512 includes the control signal of the plurality of channels, the second channel may include channel information that indicates a channel number of the plurality of channels. In a case in which the data of DMX512 is 8-bit data and the data size of one sample is 16-bit, the 8-bit data is empty data. The data processing apparatus 10 may store the channel information in the 8-bit data being the empty data. Alternatively, in the example of FIG. 5, the identification information that indicates the type of data is 6-bit data, and the header information may be 4-bit data for the identification information and 2 bits for the channel information.

As described above, the device such as lighting performs control at intervals of about a few msec, so that, even when the time lag of less than 1 msec occurs, the control timing may not lag. However, DMX512 serially sends a control signal for a maximum of 512 channels. Therefore, when the digital signal of the second channel lags by one sample, the control signal of a different channel may be sent to a device different from a target device. However, in a case in which the channel information is included in the second channel as described above, the data processing apparatus 10 that reproduces the multitrack audio data is able to send an appropriate control signal to an appropriate device, based on the channel information.

As described above, the multitrack data in which a live performance is recorded is generated. The processor 154 outputs the multitrack audio data generated as described above (S13). The multitrack audio data may be stored in the flash memory 103 of the own apparatus, and may be distributed to other apparatuses through the communication I/F 106.

As described above, the data processing system 1 is installed in a venue in which an event such as a live performance, for example, is performed. The data processing apparatus 10 stores the digital audio signal received from the acoustic device during the live performance in the first channel, and receives a control signal of other devices such as lighting and stores the control signal in the second channel. The digital audio signal and the control signal are generated according to progress of the event such as the same live performance. The control signal is stored at the same frequency as the sampling frequency (48 kHz, for example) of the digital audio signal. Therefore, the data processing apparatus 10, by storing the digital audio signal of a predetermined sampling frequency (48 kHz, for example) in the first channel and generating multitrack audio data in which the control signal of the same frequency (48 kHz) as the first channel is stored, in the second channel, is able to synchronously record a plurality of digital signals to be generated by a plurality of devices without using a time code. As a result, the data processing system 1 does not need to prepare a dedicated recording device for each protocol used by each of the plurality of devices to record each data individually. In addition, the data processing system 1 does not need a time code generating device for synchronizing a plurality of devices with a time code, a cable, an interface, or the like. Moreover, the data processing system 1 does not need a setting such as adjusting a frame rate of the time code for each device.

It is to be noted that the data processing apparatus 10 may not store the video data in the multitrack audio data and may record the video data as different data. In this case, the data processing system 1 may include the time code generating device (not shown). The data processing apparatus 10 may further receive a time code from the time code generating device. In this case as well, the data processing apparatus 10 may store a received time code as a data string of the digital audio signal, in the second channel. In this case, the data processing system 1 is able to synchronize a digital signal according to video data and all other digital signals, simply by matching a frame rate of the digital signal according to the video data with a frame rate of at least one of the other digital signals (a digital audio signal that the mixer 11 outputs, for example).

The second channel shown in the present embodiment stores a digital signal different from audio data as a data string of a digital audio signal, and therefore complies with a protocol (the protocol of Dante (registered trademark), for example) of predetermined multitrack audio data. Therefore, the second channel is also able to reproduce as audio data and is also able to perform editing such as copying, cutting, pasting, or timing adjustment, by use of an audio data editing application program such as DAW (Digital Audio Workstation). For example, a user, when cutting and pasting audio data of the first channel and the second channel that is included in a certain time zone to a different time zone by using the DAW, can move not only the audio data but also DMX512 data and the like to the different time zone without losing synchronization.

The second channel may store position information on the device such as lighting. The position information is expressed, for example, in three-axis orthogonal coordinates with the origin at a certain position in a live venue. The data processing apparatus 10 may extract the position information, and may display the position of the device such as lighting in the live venue, on a display, based on the position information. For example, the data processing apparatus 10 obtains three-dimensional CAD data that indicates a shape of the live venue, and displays a three-dimensional image of the live venue based on the three-dimensional CAD data. Then, the data processing apparatus 10 displays an image that imitates each device in the three-dimensional image, and then displays the position of each device in the live venue. As a result, an operator of a reproduction venue can set the device such as lighting at a position same as or close to the live venue while referring to the position of the device such as lighting displayed on the display. Next, FIG. 6 is a block diagram showing a configuration of a data processing system LA under a reproduction environment of a live performance. The data processing system LA is installed in a venue for reproducing an event such as a live performance, at a remote place, for example.

The data processing system LA includes the same hardware organization as the data processing system 1 shown in FIG. 1. Therefore, the same reference numerals are used to refer to all components, and the description will be omitted. However, the video device 13, while including a camera in the data processing system 1, has a video reproduction device that reproduces video data and a video display device such as a projector, in place of the camera, in the data processing system LA.

Figure 7:
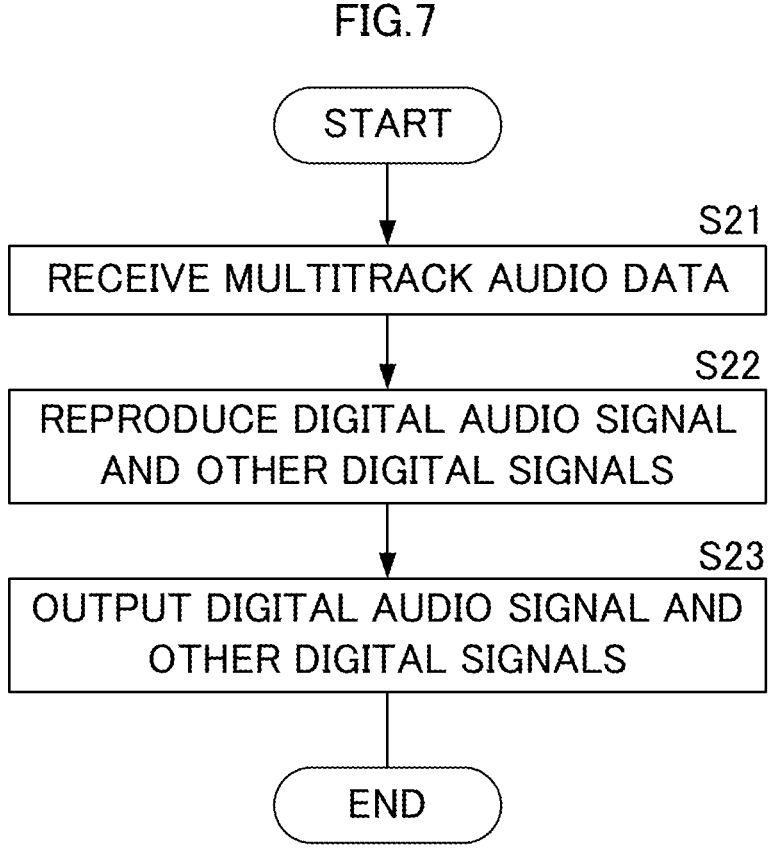
FIG. 7 is a flowchart showing an operation during reproduction of a processor 154 of the data processing apparatus 10.

FIG. 7 is a flowchart showing an operation during reproduction of the processor 154 of the data processing apparatus 10. First, the processor 154 receives the multitrack audio data (S21). The multitrack audio data is received from the data processing apparatus 10 in a venue in which a live performance is being performed, or received from the server. Alternatively, the data processing apparatus 10 reads the multitrack audio data according to a past live performance stored in the flash memory 103. Alternatively, the data processing apparatus 10 reads the multitrack audio data according to a past live performance stored in another apparatus such as a server.

The processor 154 decodes received multitrack audio data, and reproduces (S22) and outputs (S23) a digital audio signal and other digital signals. For example, the processor 154 extracts digital audio signal of the channels 1 to 32 being the first channel, and makes output to the mixer 11. The mixer 11 outputs received digital audio signal to an acoustic device such as a speaker, and reproduces a singing sound or a performance sound.

In addition, the processor 154 reads 8-bit header information and extracts an 8-bit or 16-bit data body, from each sample of the channels 33 to 64 being the second channel. The second channel may include the data according to a signal processing parameter or basic setting of the mixer 11. The processor 154 may extract the data according to the signal processing parameter or the basic setting and may make output to the mixer 11.

The mixer 11 receives a signal processing parameter or setting data from the data processing apparatus 10, and performs various types of signal processing on the audio signal received based on the signal processing parameter and the setting data. Accordingly, the mixer 11 reproduces a singing sound or a performance sound in the same state as the live performance.

The processor 154 outputs an extracted digital signal of DMX512 to the lighting controller 12 and the laser controller 16. The lighting controller 12 and the laser controller 16 each control lighting and laser based on a received digital signal of DMX512. Accordingly, production of the lighting, laser, or the like during the live performance is reproduced.

Similarly, the processor 154 outputs an extracted MIDI digital signal and GPI digital signal to the GPI control device 14 and the MIDI device 15. The GPI control device 14 and the MIDI device 15 each control a MIDI device and a GPI device based on the received digital signal received.

In addition, the processor 154, when video data is included in the second channel, extracts the video data and makes output to the video device 13. For example, as described above, in a case in which the video data is stored in three channels of the channels 33, 34, and 35, the processor 154 sequentially extracts the data included in the three channels of the channels 33, 34, and 35, and makes output to the video device 13. The video device 13 includes a video reproduction device and a projector. The video device 13 reproduces video data by use of the video reproduction device. A screen is installed at the reproduction venue. The video device 13 displays live video on the screen, based on the video data received from the data processing apparatus 10.

In a case in which the video data is recorded aside from the multitrack audio data and is synchronized with a time code, the data processing apparatus 10 outputs the video data and the time code to the video device 13. The video device 13 reproduces the video data based on the time code and displays a live video on the screen. In addition, other devices except the video device 13 control each device based on the time code included in multitrack audio data.

It is to be noted that the reproduction venue does not need to include the same hardware configuration as the venue in which the event such as a live performance is performed. The data processing apparatus 10, according to the device installed in the reproduction venue, may extract necessary data from the multitrack audio data and may make output to each device.

In this way, the data processing apparatus 10, in the reproduction venue, extracts and outputs the digital audio signal of the first channel of each sample and also extracts and outputs the digital signal such as a control signal of the second channel of each sample, and therefore is able to synchronously reproduce the plurality of digital signals by the plurality of devices without using the time code.

It is to be noted that the digital signal such as a control signal stored in the second channel may configure one data from a plurality of samples. However, even when the time lag of the plurality of samples occurs in the plurality of devices, the time lag of 48-kHz sampling frequency is less than 1 msec. The device such as lighting performs control at intervals of about a few msec, so that, even when the time lag of less than 1 msec occurs, the control timing may not lag. Therefore, the data processing system LA synchronizes the devices such as lighting for production, in addition to synchronous reproduction of a sound and video, so that the audience in the reproduction venue can feel like participating in the event such as a live performance, while being present in a different venue from the venue of the live performance.

The data processing system shown in the present embodiment is applicable to a system required to combine video, sound, and production of a theme park or the like. Alternatively, a commercial establishment outputs BGM in closing and turns off lighting. The data processing system shown in the present embodiment is also applicable to a system that interlocks lighting with audio in such a commercial establishment.

Subsequently, an example of the screen to be used in a reproduction venue will be described. Conventionally, the screen mainly has the type of horizontally hanging a screen off a long bar, the type of sticking a screen on a metal frame, or the like. These screens require a structure to be suspended from a ceiling. In addition, the conventional screen has a problem that a project area is not easily changed, which does not allow use in a venue with various facilities. The operator of an event, although preparing a screen with a large area for a large venue, does not easily bring in the screen with a large area when an entrance of the venue is hypothetically narrow.

Therefore, an object of the present embodiment is to provide a screen that is able to be installed at a venue with various facilities and easily changes a project area.

A screen unit according to the present embodiment has a panel that functions as a plane screen, and a frame that holds the panel from a back surface, and the panel is configured to be disassembled into a plurality of individual panels.

Figure 8:
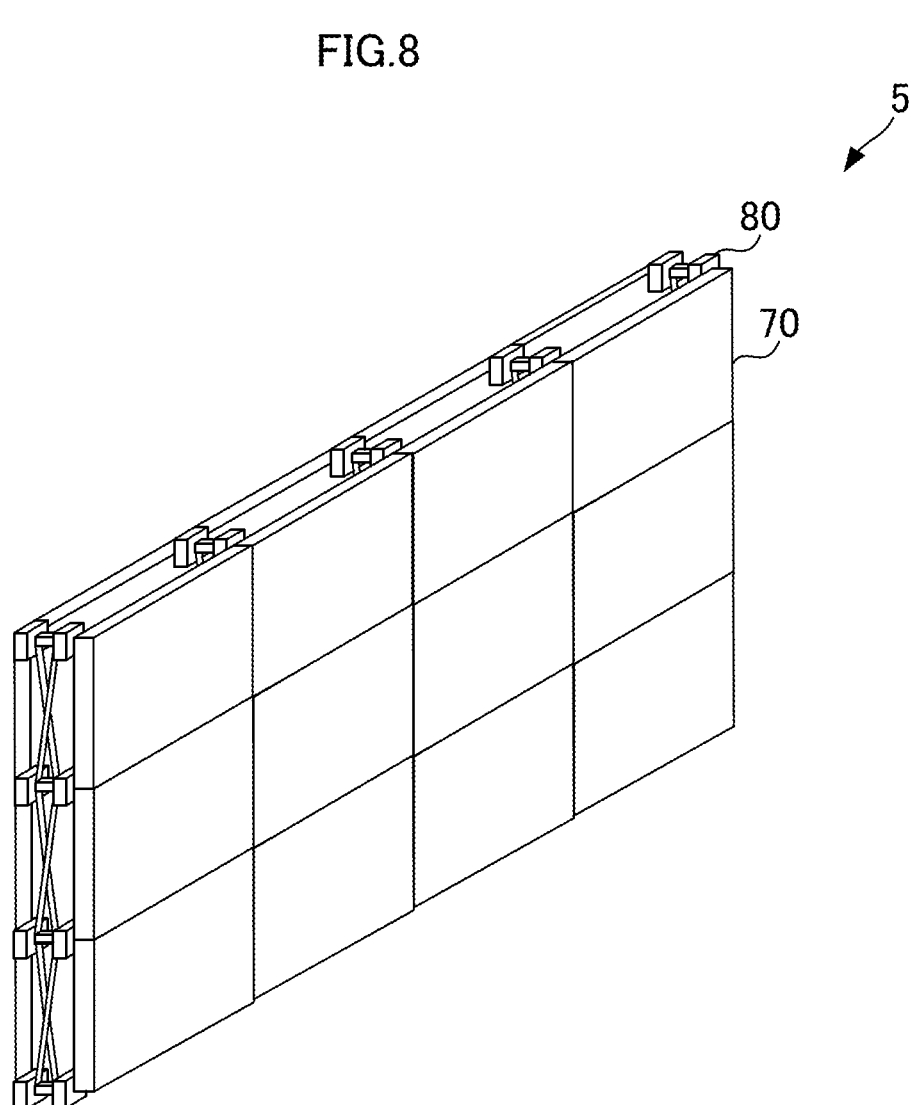
FIG. 8 is a perspective view of a screen unit 5.

FIG. 8 is a perspective view of a screen unit 5. The screen unit 5 has a plate-shaped panel 70 and a frame 80. In the example of FIG. 8, the screen unit 5 has 12 individual panels 70A.

Figure 9:
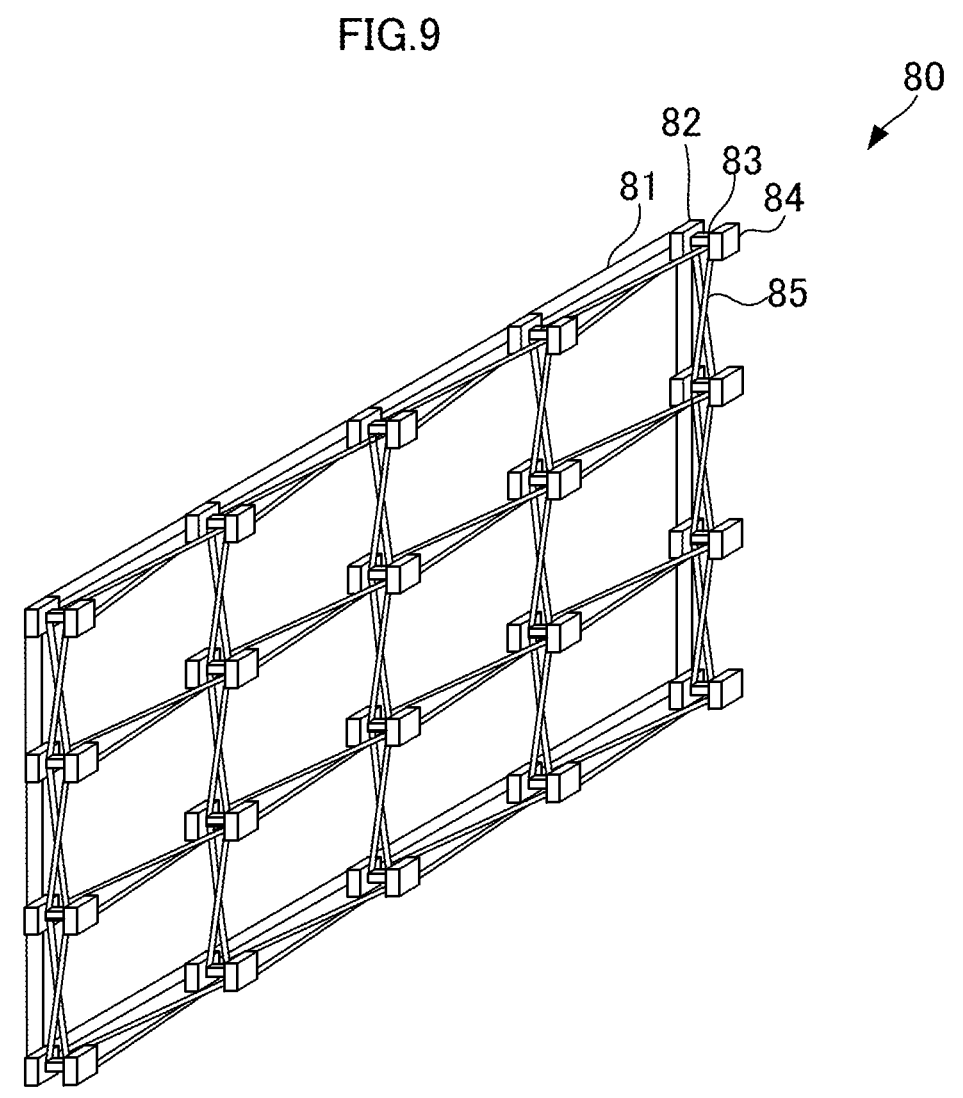
FIG. 9 is a perspective view of a frame 80 when a panel 70 is removed.

FIG. 9 is a perspective view of the frame 80 when the panel 70 is removed. The frame 80 includes a base 81, a back block 82, a coupling element 83, a front block 84, and a coupling frame 85.

The front block 84 and the back block 82 are made of a rectangular parallelepiped shape, for example. The front block 84 is placed corresponding to four corners of a plate-shaped individual panel 70A. The frame 80 has 20 front blocks 84, and places these 20 front blocks 84 at four corners of each of 12 panels.

The back block 82 is made of a rectangular parallelepiped shape, for example. The frame 80 has 20 back blocks 82, which is the same number as the front blocks 84. The coupling element 83 couples on the back block 82 and the front block 84 back and forth.

The base 81 couples 14 back blocks 82 placed at the outermost periphery of the frame 80, side by side vertically or horizontally.

The coupling frame 85 couples the back block 82 and the front block 84 to be aligned vertically or horizontally. For example, the front block 84 at the upper right corner of the figure, through the coupling frame 85, is coupled to the back block 82 on one block down vertically when the frame 80 is viewed from the front. In addition, for example, the front block 84 at the upper right corner of the figure, through the coupling frame 85, is coupled to the back block 82 at one block left horizontally when the frame 80 is viewed from the front.

Accordingly, the frame 80 stably couples the 20 back blocks 82 and front blocks 84. Five back blocks 82 and five front blocks 84 placed on the bottom vertically when the frame 80 is viewed from the front are installed on a floor or the like. Therefore, the frame 80 becomes independent with one bottom surface of each of the 20 front blocks 84 facing forward.

It is to be noted that the base 81 is bent in the center. In addition, the two coupling frames 85 are rotatably connected in the center of the back block 82 and the front block 84 that are aligned vertically or horizontally. As a result, the frame 80 is foldable into a small size.

Figure 10:
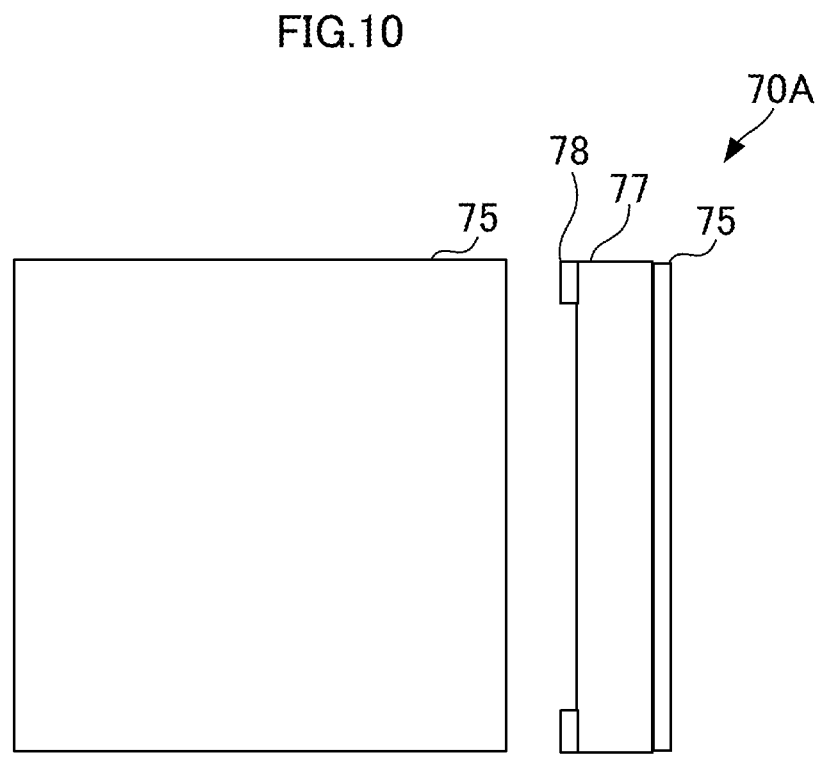

The one bottom surface of each of the 20 front blocks 84 is mounted on the four corners of the plate-shaped individual panel 70A. FIG. 10 is a front view and side view of the individual panel 70A. The figure shown on the left side of FIG. 10 is a front view of the individual panel 70A, and the figure shown on the right side is a left side view of the individual panel 70A. Other individual panels also have the same configuration as the individual panel 70A shown in FIG. 10.

The individual panel 70A has a board material 77, a screen element 75, and a magnet 78. The board material 77 is a flat plate-shaped element made of metal, a resin, or a wooden material. The screen element 75 is attached to a front surface of the board material 77. The screen element 75 is a white reflective material that projects a projector image.

The magnet 78 is placed at four corners of a back surface of the board material 77. When the front block 84 is a magnetic metal, the individual panel 70A attracts to the front block 84 by the magnet 78. The front block 84, while serving as a guide for mounting the screen element 75, functions as a holding element to hold the screen element 75. As a result, the front block 84 is able to prevent the screen element 75 from falling or shifting. The operator of an event configures the one panel 70 by causing the frame 80 in the state shown in FIG. 9 to attract the 12 individual panels 70A. That is to say, the panel 70 is configured to be disassembled into the plurality of individual panels 70A.

In this way, the screen unit 5 is able to disassemble the one large panel 70 into the individual panels 70A. In addition, the frame 80 is foldable into a small size. Therefore, the operator of an event can easily bring in the screen unit 5 also from a small entrance or the like of a venue. In addition, the frame 80, since being independent, needs no structure for hanging or fixing the screen. In addition, the screen unit 5 is able to freely change a size and angle of view (an aspect ratio) according to the content of the event or the venue. The operator of an event can easily install a screen of an optimal size and angle of view (an aspect ratio) set according to the content of the event or the venue, by preparing any number of individual panels 70A.

Furthermore, the screen unit 5 makes structures such as the frame 80 invisible, when viewed from the front. Therefore, participants in the event can see only the projector image, and can increase the sense of immersion into the event.

It is to be noted that a method of mounting the individual panel 70A to the frame 80 is not limited to attraction by the magnet 78. For example, the individual panel 70A may be mounted on the front block 84 by a hook-and-loop fastener. Alternatively, the individual panel 70A may be mounted by being screwed from the back surface of the front block 84.

Figure 11:
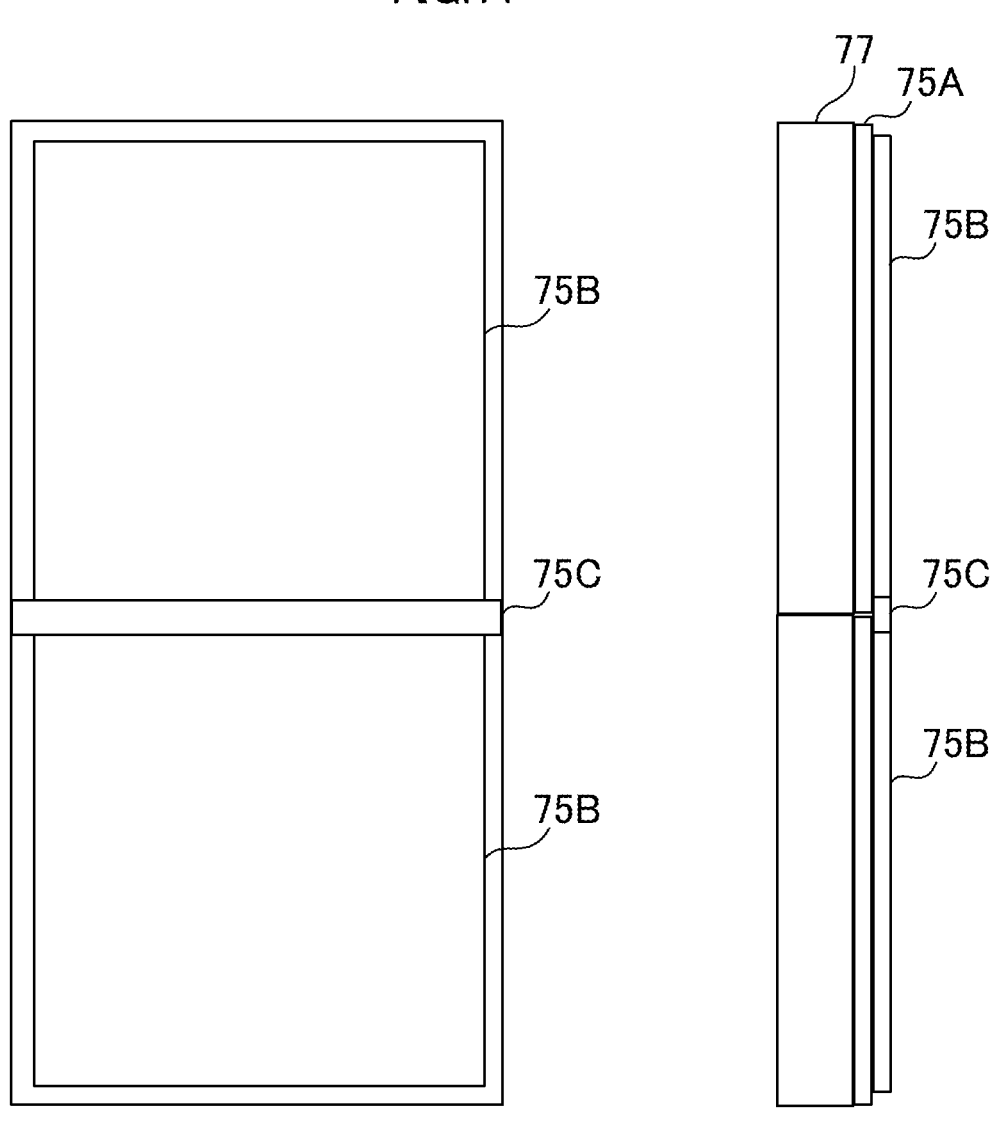
FIG. 11 is a front view and a side view of an individual panel 70A according to another example.

FIG. 11 is a front view and side view of an individual panel 70A according to another example. The figure shown on the left side of FIG. 11 is a front view when the two individual panels 70A are vertically arranged, and the figure shown on the right side is a left side view when the two individual panels 70A are vertically arranged.

A first screen element 75A and a second screen element 75B are attached to the front surface of the board material 77. The second screen element 75B is attached to the first screen element with an adhesive, for example. The first screen element 75A is attached to the board material 77 so as to cover the entire front surface of the board material 77. The second screen element 75B has an area smaller than the area of the first screen element 75A, when viewed from the front. Therefore, when the individual panel 70A is viewed from the front, the first screen element 75A is exposed from the outer periphery of the second screen element 75B.

The third screen element 75C is attached to the first screen element 75A so as to cover a part from which the first screen element 75A is exposed, when the plurality of individual panels 70A are arranged. The height (the thickness) of the third screen element 75C is the same as the height (the thickness) of the second screen element 75B. Therefore, the front surfaces of the second screen element 75B and the third screen element 75C are at the same height. Therefore, light of a projector, even when being emitted obliquely, does not generate a shadow.

Figure 13:
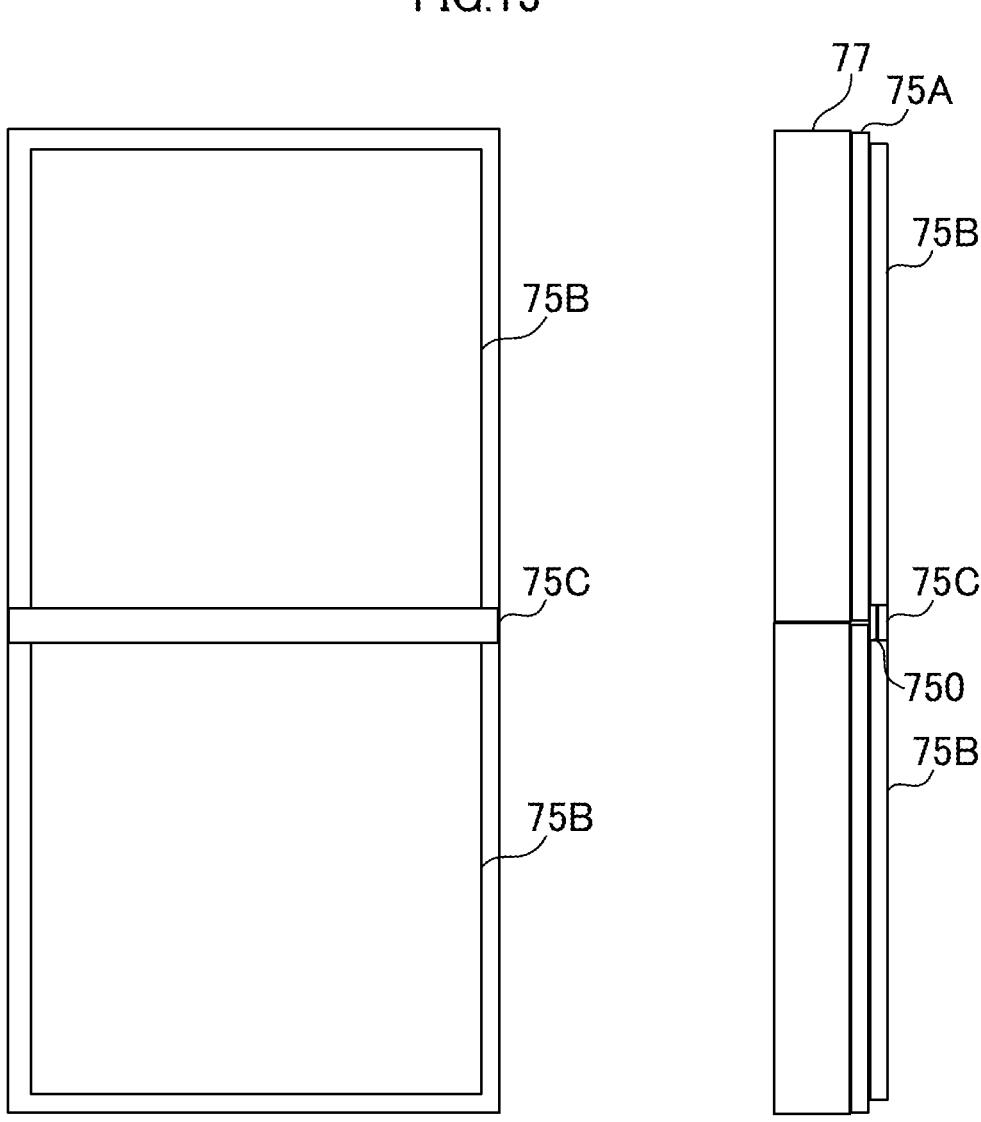
FIG. 13 is a front view and a side view of an individual panel 70A according to another example.

It is to be noted that the third screen element 75C, as shown in FIG. 13, may be attached to the first screen element 75A with a double-sided tape 750. In this case, the height (the thickness) of the third screen element 75C is smaller than the height (the thickness) of the second screen element 75B only by a thickness of a component such as the double-sided tape.

Figure 14:
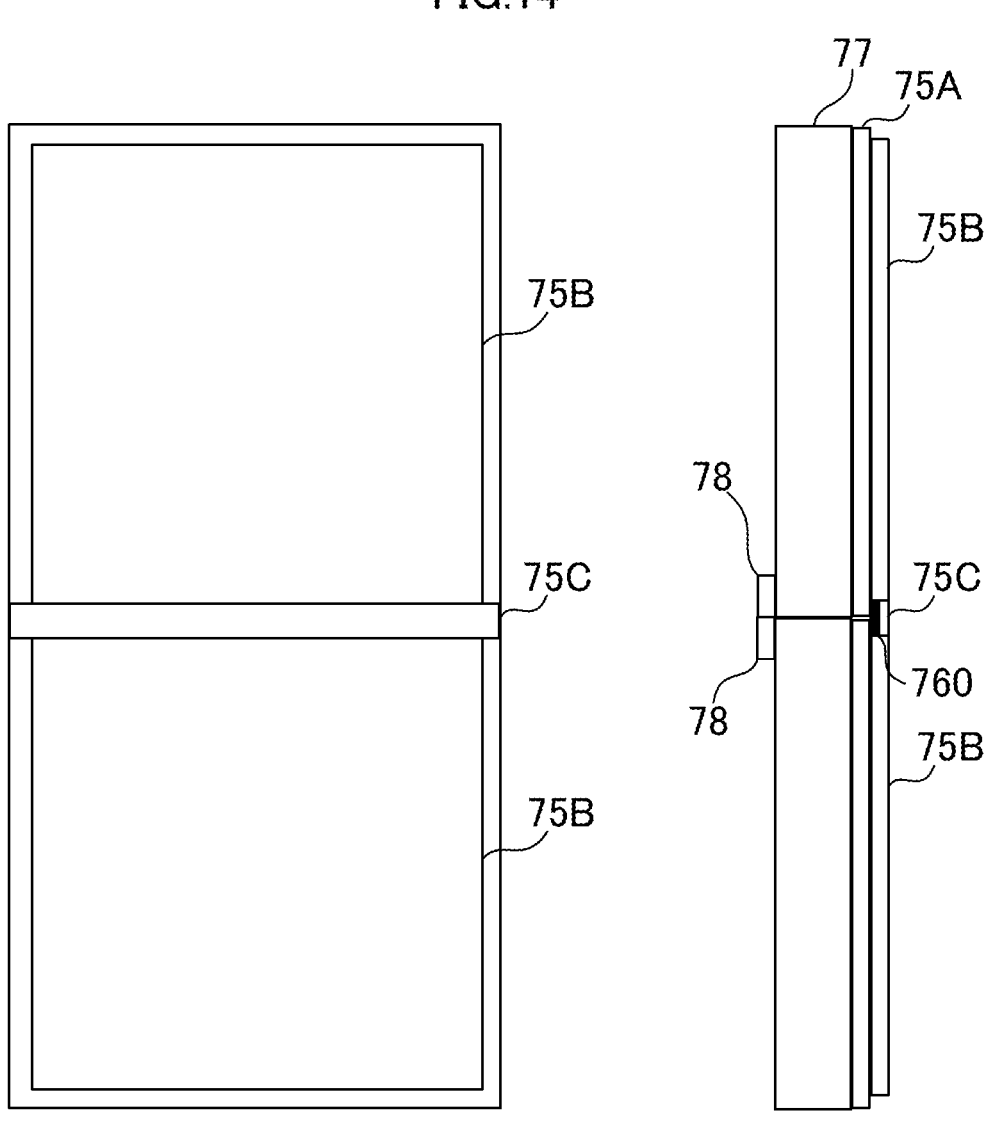
FIG. 14 is a front view and a side view of an individual panel 70A according to another example.

In addition, the third screen element 75C, as shown in FIG. 14, may be attached to a thin plate-shaped magnetic body 760 with an adhesive. In this case, the magnetic body 760 is attracted by the magnet 78 placed on the back surface of the board material 77. Therefore, the third screen element 75C is attracted to the first screen element 75A through the magnetic body 760. As a result, the third screen element 75C is able to be easily mounted and demounted by magnetic attraction without using an adhesive or a double-sided tape.

It is to be noted that the magnetic body 760 preferably uses hardened ribbon steel or the like with high smoothness and flexibility. As a result, the strength of the third screen element 75C is able to be increased. Accordingly, even when a gap occurs while the plurality of individual panels 70A are arranged, the gap is covered with the third screen element 75C. Therefore, the screen unit 5, when viewed from the front, makes the gap between the plurality of individual panels 70A invisible. Therefore, the participants in the event are no longer concerned about the gap between the plurality of individual panels 70A, see only the projector image, and can further increase the sense of immersion into the event.

Figure 12:
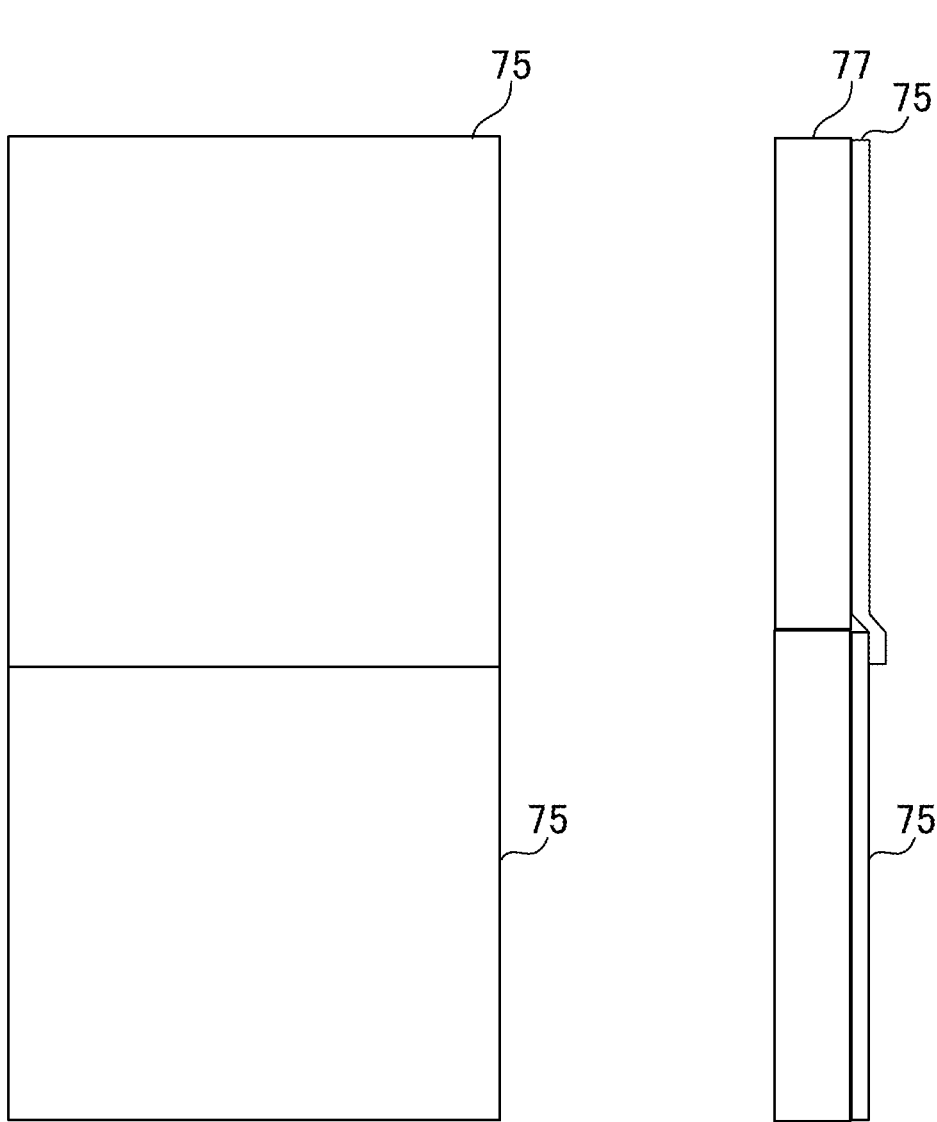
FIG. 12 is a front view and a side view of an individual panel 70A according to another example.

The method of filling the gap between the plurality of individual panels 70A is not limited to the example of FIG. 11. For example, as shown in FIG. 12, an area of the screen element 75 may be increased so that the screen element 75 with the large area may cover a part of the front of an adjacent individual panel 70A. However, the configuration to fill the gap between the plurality of individual panels 70A as shown in FIG. 11 does not generate a shadow even when the light of the projector is emitted obliquely, and therefore is able to further increase the sense of immersion into the event.

Figure 15:
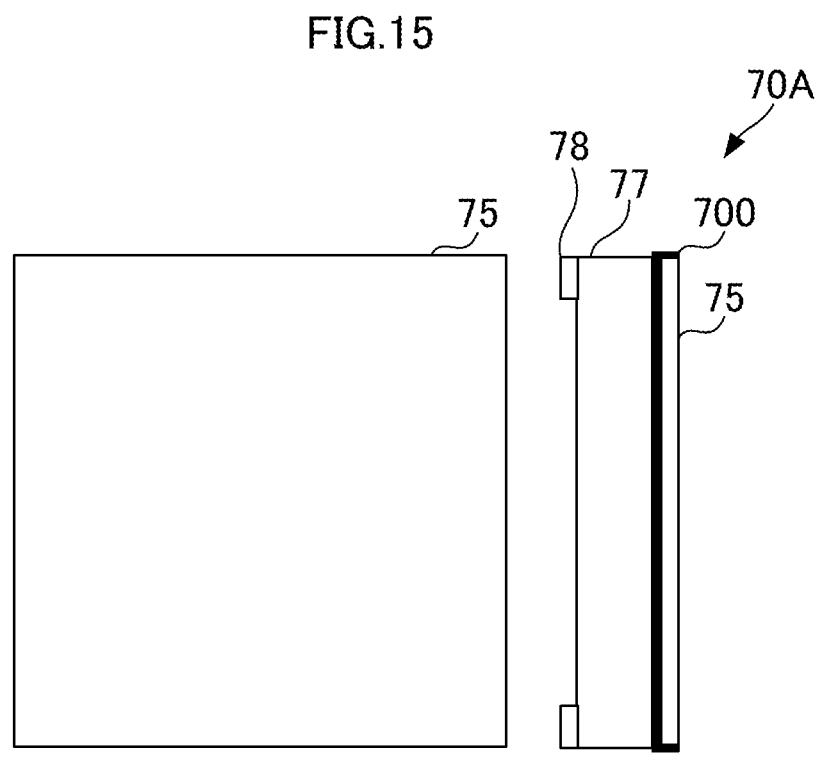

As shown in FIG. 15, the back and side surfaces of the screen element 75 may be attached with a shading material 700. As a result, external light does not penetrate from the back and side surfaces of the screen element 75. Therefore, the external light no longer adversely affects the image projected on the screen element 75.

The description of the foregoing embodiments is illustrative in all points and should not be construed to limit the present disclosure. The scope of the present disclosure is defined not by the foregoing embodiments but by the following claims. Further, the scope of the present disclosure is intended to include all modifications within the scopes of the claims and within the meanings and scopes of equivalents. For example, although the above embodiment configures the processor of the present disclosure by the program read by the CPU 104, the processor of the present disclosure is also able to be achieved, for example, by FPGA (Field-Programmable Gate Array).

The invention claimed is:

1. A data processing method performed by a processor that receives data signals from a plurality of devices that utilize different protocols from each other, the data processing method comprising:
   receiving data signals, respectively, from each of the plurality of devices; and
   generating multitrack audio data, in which audio data of a plurality of channels is stored, by:
   storing a first data string of a digital audio signal, received from a first device of the plurality of devices that utilizes a first protocol, in a first channel of the plurality of channels; and
   storing a data string of a digital signal, related to the digital audio signal and received from a second device of the plurality of devices that utilizes a second protocol different from the first protocol, as a second data string of the digital audio signal in a second channel of the plurality of channels,
   wherein the data string of the digital signal, related to the digital audio signal and received from the second device of the plurality of devices that utilizes the second protocol different from the first protocol, in the second channel is synchronously stored with the first data string of the digital audio signal, received from the first device of the plurality of devices that utilizes the first protocol, in the first channel in the generated multitrack audio data by generating the digital audio signal and the digital signal according to a progress of an event and storing the digital signal at the same frequency as a sampling frequency of the digital audio signal.

2. The data processing method according to claim 1, further comprising distributing the generated multitrack audio data to another plurality of devices.

3. The data processing method according to claim 1, wherein the second channel includes identification information that indicates a type of the digital signal.

4. The data processing method according to claim 1, wherein:
   the second channel includes a plurality of data samples;
   at least one data sample of the plurality of data samples is invalid data; and
   the second data string of the digital audio signal is stored, in the second channel, as a data sample of the plurality of data samples other than the data sample of the invalid data.

5. The data processing method according to claim 1, wherein:
   the digital signal includes (i) data of the same type and having a plurality of channels or (ii) data of a plurality of different types of data; and
   the digital signal including (i) the data of the same type and having the plurality of channels or (ii) the data of the plurality of different types of data is stored in the second channel.

6. The data processing method according to claim 1, wherein:
   the second channel includes a plurality of channels; and
   the digital signal is stored across the plurality of channels of the second channel.

7. The data processing method according to claim 1, wherein the digital signal includes a control signal of a lighting device.

8. The data processing method according to claim 7, wherein:
   the control signal includes a control signal of the plurality of channels; and
   the second channel includes channel information that indicates a channel number of the plurality of channels.

9. The data processing method according to claim 1, wherein the digital signal includes video data.

10. The data processing method according to claim 1, wherein the second protocol is configured so as to comply with a protocol of predetermined multitrack audio data.

11. The data processing method according to claim 1, wherein the first data string of the digital audio signal stored in the first channel in the generated multitrack audio data is stored as it is.

12. The data processing method according to claim 11, wherein the data string of the digital signal stored in the second channel in the generated multitrack audio data is stored with header information and a data body.

13. The data processing method according to claim 12, wherein the header information includes identification information that indicates a type of the data stored in the data body.

14. A data processing method that reproduces data signals of a plurality of devices that utilize different protocols from each other, the data processing method comprising:
   receiving multitrack audio data in which audio data of a plurality of channels is stored; and
   reproducing the received multitrack audio data by:

reproducing a first data string stored in a first channel of the plurality of channels as a digital audio signal of a first device of the plurality of devices that utilizes a first protocol; and reproducing a second data string stored in a second channel of the plurality of channels as a digital signal, related to the digital audio signal, of a second device of the plurality of devices that utilizes a second protocol different from the first protocol, wherein the second data string stored in the second channel and the first data string stored in the first channel are synchronously stored in the received multitrack audio data by the digital audio signal and the digital signal having been generated according to a progress of an event and the digital signal having been stored at the same frequency as a sampling frequency of the digital audio signal.

15. A data processing apparatus that receives data signals from a plurality of devices that utilize different protocols from each other, the data processing apparatus comprising:

a communication interface configured to receive data signals, respectively, from each of the plurality of devices; and a processor configured to generate multitrack audio data in which audio data of a plurality of channels is stored, wherein to generate the multitrack audio data in which the audio data of the plurality of channels is stored, the processor is configured to:

store a first data string of a digital audio signal, received from a first device of the plurality of devices that utilizes a first protocol, in a first channel of the plurality of channels; and store a data string of a digital signal, related to the digital audio signal and received from a second device of the plurality of devices that utilizes a second protocol different from the first protocol, as a second data string of the digital audio signal in a second channel of the plurality of channels, wherein the data string of the digital signal, related to the digital audio signal and received from the second device of the plurality of devices that utilizes the second protocol different from the first protocol, in the second channel is synchronously stored with the first data string of the digital audio signal, received from the first device of the plurality of devices that utilizes the first protocol, in the first channel in the generated multitrack audio data by generating the digital audio signal and the digital signal according to a progress of an event and storing the digital signal at the same frequency as a sampling frequency of the digital audio signal.

16. The data processing apparatus according to claim 15, wherein the processor is further configured to store identification information that indicates a type of the digital signal in the second channel.

17. The data processing apparatus according to claim 15, wherein:

the processor stores a plurality of data samples in the second channel;

at least one data sample of the plurality of data samples is invalid data; and the processor stores the second data string of the digital audio signal, in the second channel, as a data sample of the plurality of data samples other than the data sample of the invalid data.

18. The data processing apparatus according to claim 15, wherein the digital signal includes (i) data of the same type and having a plurality of channels or (ii) data of a plurality of different types of data; and wherein the processor stores the digital signal including (i) the data of the same type and having the plurality of channels or (ii) the data of the plurality of different types of data in the second channel.

19. The data processing apparatus according to claim 15, wherein the second channel includes a plurality of channels; and wherein the processor stores the digital signal across the plurality of channels of the second channel.

20. The data processing apparatus according to claim 15, wherein the digital signal includes a control signal of a lighting device.

\* \* \* \* \*